United States Patent
Langhoff

(10) Patent No.: US 6,367,839 B1
(45) Date of Patent: Apr. 9, 2002

(54) PADDED BUNK RESTRAINT

(75) Inventor: Richard V. Langhoff, Greensboro, NC (US)

(73) Assignee: Volvo Trucks North America, Inc., Greensboro, NC (US)

( * ) Notice: Subject to any disclaimer, the term of this patent is extended or adjusted under 35 U.S.C. 154(b) by 0 days.

(21) Appl. No.: 09/263,702

(22) Filed: Mar. 5, 1999

(51) Int. Cl.[7] .............................................. B60R 22/28
(52) U.S. Cl. ............................... 280/751; 5/118; 5/9.1; 297/464; 297/488; 296/190.02
(58) Field of Search .................. 280/749, 751, 280/489; 5/118, 8, 9.1, 94; 297/184.11, 464, 481, 488, 470, 471; 296/24.1, 190.02

(56) References Cited

U.S. PATENT DOCUMENTS

| | | |
|---|---|---|
| 215,618 A | 5/1879 | Hills |
| 229,833 A | 7/1880 | McMann |
| 229,834 A | 7/1880 | McMann |
| 248,915 A | 11/1881 | Christiansen |
| 272,520 A | 2/1883 | Billings |
| 304,217 A | 8/1884 | McMann |
| 424,881 A | 4/1890 | Green |
| 454,202 A | 6/1891 | Brown |
| 496,765 A | 5/1893 | Woods |
| 598,735 A | 2/1898 | Megins |
| 878,852 A | 2/1908 | Ames |
| 945,421 A | 1/1910 | Schlesinger |
| 1,198,009 A | 9/1916 | Cooper |
| 1,612,048 A | 12/1926 | Pink |
| 1,621,086 A | 3/1927 | Rossman |
| 1,959,974 A | 5/1934 | Westgate |
| 2,048,955 A | 7/1936 | Showalter |
| 2,316,710 A | 4/1943 | Parke |
| 2,531,687 A | 11/1950 | Jones |
| 2,564,480 A | 8/1951 | Jones |
| 2,611,909 A | 9/1952 | Dillon et al. |
| 2,703,413 A | 3/1955 | Klebanoff |
| 3,169,781 A | 2/1965 | Abruzzino |
| 3,203,011 A * | 8/1965 | Fauldi .............................. 5/94 |
| 3,402,960 A | 9/1968 | Erke |
| 3,695,698 A | 10/1972 | Trump |
| 4,141,093 A * | 2/1979 | Mardsen ......................... 5/118 |
| 4,619,468 A * | 10/1986 | Spill .......................... 297/488 |
| 4,630,324 A | 12/1986 | Fligsten et al. |
| 4,924,814 A | 5/1990 | Beaudet |
| 5,248,187 A * | 9/1993 | Harrison ....................... 297/488 |
| 5,375,879 A * | 12/1994 | Williams et al. ............. 280/749 |
| 5,529,341 A | 6/1996 | Hartigan |
| 5,536,042 A | 7/1996 | Williams et al. |
| 5,551,726 A * | 9/1996 | Ament ......................... 280/749 |
| 5,690,355 A | 11/1997 | Kleinberg |
| 5,702,143 A * | 12/1997 | Shimazaki ................. 296/24.1 |
| 5,984,404 A * | 11/1999 | Nova et al. ............. 296/190.02 |

FOREIGN PATENT DOCUMENTS

| CA | 1273-375 A * | 8/1990 | .................. 280/751 |
|---|---|---|---|

* cited by examiner

Primary Examiner—Douglas Hess
Assistant Examiner—Elaine Gort
(74) Attorney, Agent, or Firm—Watts, Hoffmann, Fisher & Heinke Co. L.P.A.

(57) ABSTRACT

A restraint system for protecting occupants in a sleeping compartment of a vehicle having a bunk bed includes at least two flexible straps having one end attached to a selected one of the vehicle or the bunk, and a second end. Attached to the straps is at least one energy absorbent padding in a position relative to the bunk bed for providing restraint and secondary collision protection to a prone occupant. The straps extend from the vehicle over the bunk bed to the second ends. A releasable lock is attached to the second ends for connecting the second ends to the vehicle or bunk. When not in use, the restraint system is conveniently stored so as to provide minimal impact on cab space. A strap retraction means is attached to the vehicle and has the first ends of the straps attached thereto. The strap retraction means is operable to retract the straps when the releasable lock is unlatched whereby the straps collapse into a stored position.

11 Claims, 3 Drawing Sheets

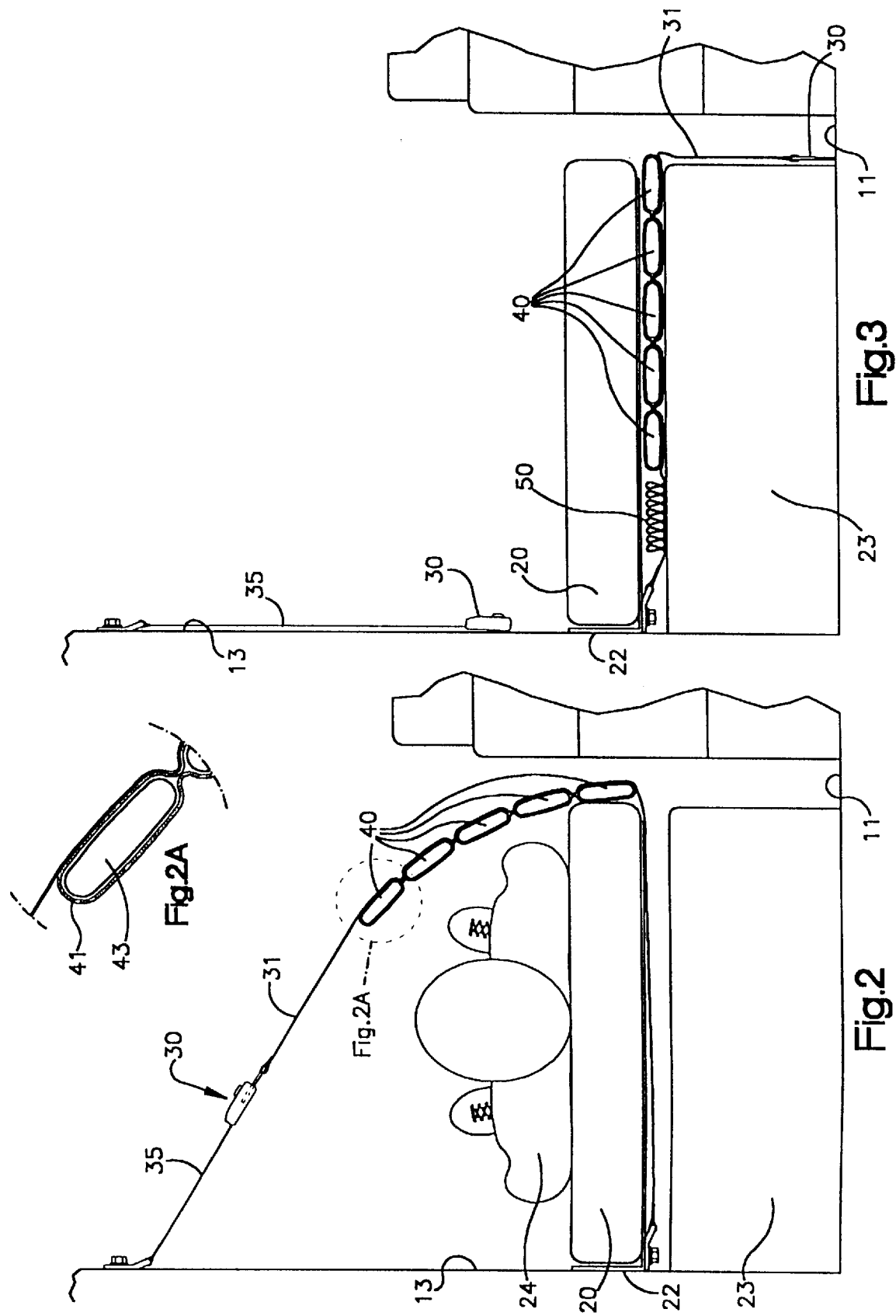

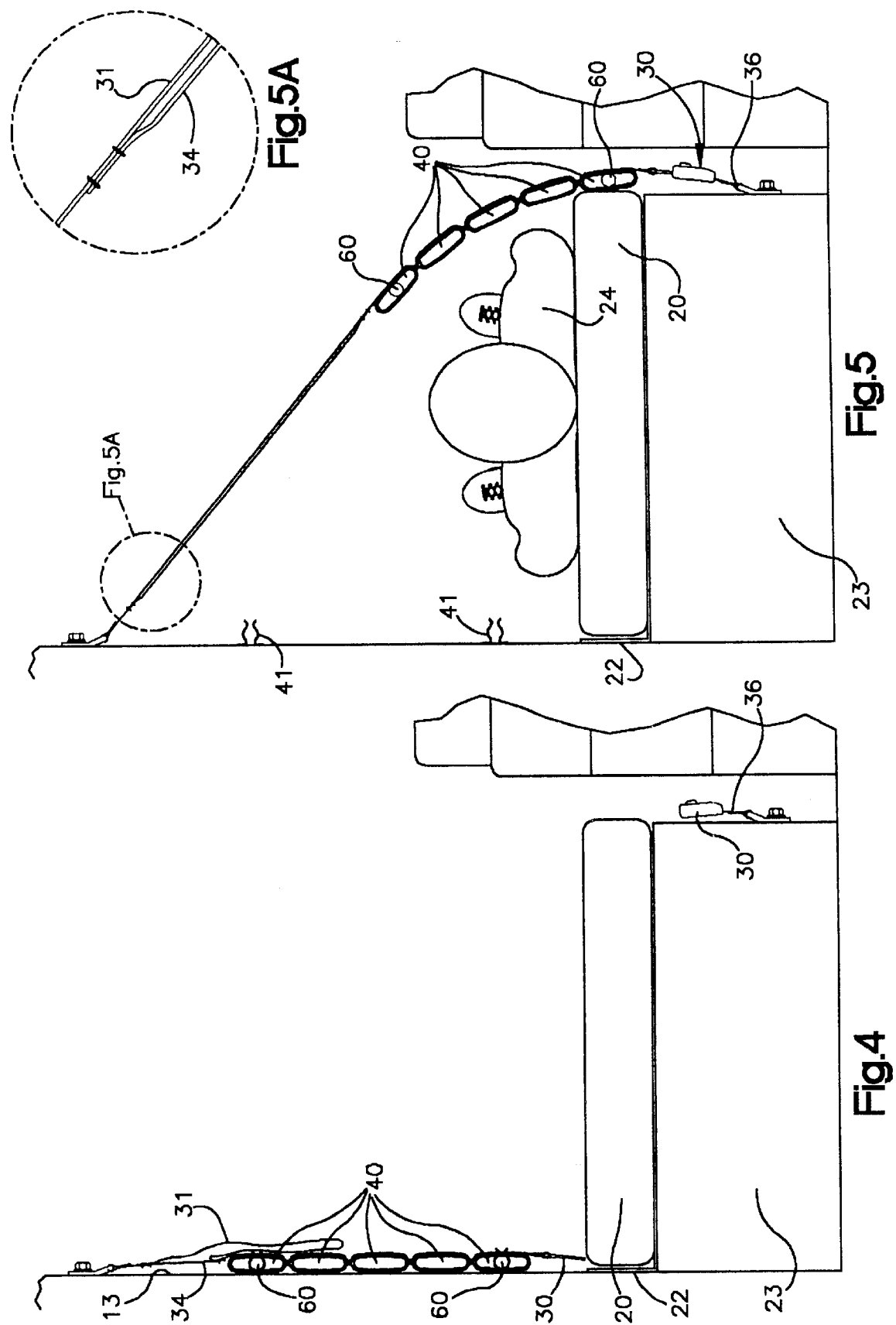

PADDED BUNK RESTRAINT

FIELD OF INVENTION

This invention relates generally to vehicle occupant restraint systems and more particularly to restraint systems for use in over the highway vehicles equipped with bunk beds.

BACKGROUND OF THE INVENTION

Vehicles such as highway tractors commonly contain a small sleeping compartment or berth containing a bed for use by non-driving occupants. Federal regulations require each vehicle of this type to have a restraint system for each bed or sleeping area. The restraint system is used when the vehicle is moving and a non-driving occupant is using the bed. Frequently used restraint systems utilize flexible harnesses or netting that function by restricting the space in which an occupant lies or by providing a way of catching the occupant during an emergency situation.

Typically, one end of the harness or netting is attached to the vehicle. The harness or netting is draped over the bunk bed and the other end is releasably attached to the vehicle providing an enclosure over the bunk bed. The other end has a releasable attachment, such as, seat belt buckles of the type used by the automotive industry in passenger cars having a buckle and tongue. One disadvantage to these types of prior art restraint systems is the lack of padding attached to the restraint system to prevent or minimize injury from a collision. The primary purpose is to prevent the occupant from falling off the bunk during normal use such as when the occupant is sleeping in the vehicle.

Restraint systems of the type described are generally bulky whereas sleeping compartments are usually small spaces. Efficient use of the space is desired. When not in use the restraint systems are typically stored above the bunk bed. Storage above the bunk protrudes into the small space, making the sleeping compartment more confined. It would be desirable to store the restraint system in a manner that would not impact living space. It would be further desirable to provide a restraint system having a retractor for quick and easy storage when the restraint system is not in use.

Other types of restraint systems employ airbags which are installed in a horizontal and/or vertical deployment position with respect to the prone occupant in the bed or sleeping area. The airbags deploy when there is an impact or event sufficient to trigger the airbag mechanism. Airbag deployment most likely will not occur during emergency stops or other non-impact situations that could impart significant forward momentum or inertia to an occupant using the bed. Moreover, airbags are relatively complex systems and expensive to install compared to harness or netting restraint systems. Once an airbag has been deployed, maintenance is required to install a new airbag. Installation of the airbags usually requires the vehicle to be out of service until the maintenance is completed. Optionally, an air cushion is installed. The air cushion does not enclose a prone occupant but rather is positioned vertically with respect to the prone occupant.

The present invention is directed to an improved restraint system that is simple, economical, and can be used on a continuous basis without the need for maintenance of the type required for air bag restraint systems. The present invention reduces injury from collisions and provides restraint to the non-driving occupant by the use of a padded bunk restraint system. The padded restraint system provides an enclosure for a prone occupant. Additionally, the present invention is designed to minimize the effect on the sleeping compartment space by providing a means for convenient storage when the occupant restraint system is not in use.

SUMMARY OF THE INVENTION

The present invention is directed to an occupant restraint system for protecting occupants in a sleeping compartment of a vehicle. The occupant restraint system includes at least two flexible straps, each having one end fixedly attached to a selected one of a vehicle or bunk. The straps extend from the fixed ends and are draped over the bunk bed to the other end. A pair of releasable locks are used for attaching the free ends of the straps to the selected one of vehicle or bunk when in use providing an enclosure over the prone occupant using the bunk bed. Energy absorbent padding is attached to the straps. The energy absorbent padding is preferably a resilient foam material. The padding is generally tubular and is in a horizontal position with its longitudinal axis transverse to the general direction of movement of the vehicle. In one embodiment, the padding comprises a plurality of interlocking foam filled profiles. In another embodiment, the padding comprises fabric construction with foam inserts. Other suitable shapes or construction of the padding will be apparent to one skilled in the art in view of this disclosure. The padding, in addition to providing restraint, advantageously absorbs the impact to the occupant incurred during emergency situations such as in collisions or fast sudden stops.

In another embodiment of the invention, a restraint system for protecting occupants in a sleeping compartment of a vehicle includes at least two flexible straps. Each flexible strap has one end attached to a strap retractor. The strap retractors are fixedly attached to the vehicle either above or below the bunk bed. When in use, the straps extend from the strap retractors and over the bunk bed to a second end providing an enclosure for an occupant using the bunk bed. Each second end of the strap has releasable locks respectively attached for connecting the strap to the vehicle and completing the enclosure. Energy absorbent padding is attached to the straps in a position relative to the bunk bed for providing, when in use, restraint and collision protection to an occupant. Each of the strap retractors is operable to retract a connected one of the straps whereby the straps collapse into a stored position. The restraint system can be stored against a vehicle wall or underneath the bunk bed depending on where the strap retractors are located. The restraint system having retractors advantageously stores the restraint system quickly and in a manner that minimizes the impact on living space.

In a further embodiment of the invention, an improved occupant restraint system for an over-the-highway tractor having a sleeping bunk within a sleeping space comprises a spaced pair of belts each including a restraint portion. Each restraint portion has, when in use, a restraint position extending upwardly and laterally inwardly relative to an occupant support surface delineated by the bunk. Each belt has spaced anchors, the anchors being for selectively maintaining the restraint portions in their respective restraint positions. Restraint enhancing and cushioning members extend, when in use, between the restraint portions. Each of the members has sufficient strength longitudinally to restrain an occupant on the bunk. Each member also being deformable so that minimal occupant discomfort is imparted when contacted by the occupant due to occupant movement relative to the bunk.

Other embodiments of the invention are contemplated to provide particular features and structural variants of the basic elements. The specific embodiments referred to, as well as possible variations and the various features and advantages of the invention will become better understood from the detailed description that follows, when considered in connection with the accompanying drawings.

BRIEF DESCRIPTION OF THE DRAWINGS

FIG. 2 is side elevational view showing a prone occupant and the occupant restraint system in use;

FIG. 2A is an exploded cross-sectional view of a padding profile in accordance with one embodiment of the invention;

FIG. 3 is a side elevational view showing the occupant restraint system in the Storage position located underneath the bunk bed;

FIG. 4 is a side elevational view showing the occupant restraint system in the storage position located above the bunk bed.

FIG. 5 is a side elevational view showing a prone occupant and the occupant restraint system in use.

FIG. 5A is an exploded cross sectional view of the strap when the occupant restraint system is in use

DETAILED DESCRIPTION OF THE PREFERRED EMBODIMENTS

Figure 1:
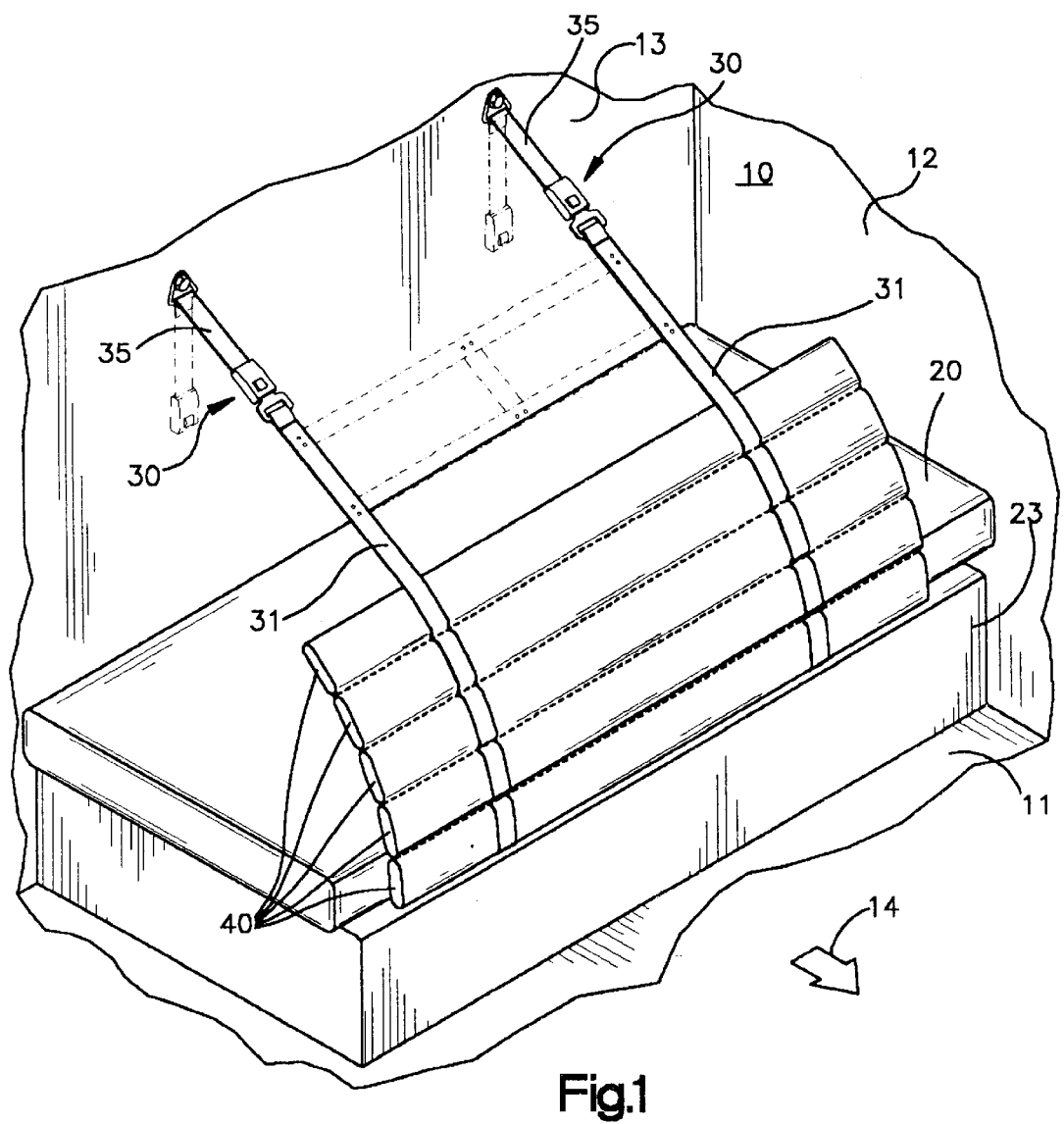
FIG. 1 is a perspective view showing an occupant restraint system constructed in accordance with the present invention.

Referring now to FIGS. 1 and 2A, there is shown a sleeper compartment having a bunk bed provided within the cab of a highway tractor. A reclining occupant 24 is shown in FIG. 2. The compartment is formed by a floor 11 and a pair of sidewalls 12 extending outwardly from a rear wall 13. The normal direction of the vehicle is shown by arrow 14. Fixedly mounted atop the floor 11 is at least one bunk bed. The bunk bed consists of a mattress 20 and a bunk frame 22 (shown in FIGS. 2–5). The mattress rests atop the upper surface of the bunk frame. The bunk frame can be supported by a plurality of legs (not shown), fixedly attached to the rear wall as shown in FIG. 2, or be supported by a platform 23 or a combination thereof (not shown).

The sleeper compartment has an occupant restraint system 10 shown in the in-use position. The occupant restraint system includes at least two flexible straps 31. The straps 31 extend from underneath the bunk frame 22 over the mattress to an area near the rear wall providing an enclosure for the prone occupant. The straps can be of any dimension or thickness but should be of sufficient strength to meet all applicable federal regulations pertaining to occupant restraint systems. Examples of suitable straps include belts, ropes and webbing. The straps are flexible to absorb some of the energy from the occupant during restraint and to provide easy storage when not in use. Examples of suitable flexible material include leather, rope, nylon, elastics, and fabric. Other straps and materials will be apparent to one skilled in the art in view of this disclosure.

One end of each strap 31 is fixedly attached to the vehicle underneath the bunk frame. Any means of attachment may be used and will be known to those skilled in the art. The other end of each strap 31 is attached to the rear wall 13 by means of a releasable lock 30. The releasable lock 30 preferably includes a buckle (not shown) and a tongue (not shown). A selected one of the tongue and buckle is fixedly attached to the end of the strap 31. The other one of the buckle or tongue is attached to an end of another strap 35 extending from the rear wall. The other end of the strap 35 is fixedly attached to the rear wall. Alternatively, the other one of the buckle or tongue may be attached directly to the rear wall of the vehicle.

At least one energy absorbent padding 40 is respectively attached to the straps 31 in a position, when in use, relative to the bunk bed for providing restraint and secondary collision protection to an occupant. The energy absorbent padding is preferably a resilient material such as urethane foam and is sewn to the strap. Other suitable materials will be apparent to one skilled in the art in view of this disclosure. The padding is generally tubular and is preferably in a horizontal position with its longitudinal axis transverse to the direction of movement of the vehicle as shown by arrow 14. In one embodiment the padding comprises a plurality of interlocking foam filled profiles (not shown). In another embodiment the padding comprises fabric construction 41 with foam inserts 43 (not shown). It will be appreciated by those skilled in the art that the location and construction of the padding is not limited to that shown and may be located or maximized at critical areas of the system, i.e. at head or chest areas of a prone occupant. The padding, in addition to providing restraint, advantageously absorbs the impact incurred to an occupant during an emergency situation.

Referring now to FIG. 3, there is shown the occupant restraint system 10 when not in use. The releasable lock 30 is unlatched and the enclosure provided by the occupant restraint system 10 is withdrawn underneath the bunk frame 25 by means of a retractor 50. The straps 31 are attached to the retractor. The retractor is attached to the bunk frame 22 near or on the rear wall 13. The retractor 50 withdraws the straps of the occupant restraint system such that the padding attached to the straps is located generally underneath the bunk frame. Portions of the straps 31 not having any padding are not fully withdrawn underneath the bunk frame. The retractor 50 is preferably an elastic band and generally pulls the occupant restraint system from above the bed to underneath the bed for storage. Other retractors 50 for use in the present invention, such as a spring mechanism, will be apparent to one skilled in the art in view of this disclosure.

In another embodiment, the occupant restraint system 10, illustrated in FIGS. 4 and 5, is stored above the bunk bed. At least two of the straps is 31 are fixedly mounted above the mattress to the rear wall 13 of the vehicle. The other end of each strap 31 includes the releasable lock 30 and attaches to the vehicle at a location forward the mattress 20. When in-use the straps extend from the rear wall and over the mattress to an area forward the mattress providing an enclosure for a prone occupant as shown in FIG. 5. Each strap 31 is attached to the forward position 13 with a releasable lock 30. A selected one of the buckle (not shown) or tongue (not shown) is attached to the ends of at least two separate straps 31. The other of the buckle or tongue is fixedly attached to the ends of another strap 36. The other end of strap 36 is fixedly attached to the front of the bunk bed 20, 22, preferably to the floor of the vehicle. When in-use the straps provide an enclosure for the prone occupant.

At least one energy absorbent padding 40 is respectively attached to the straps 31 in a position, when in use, relative to the bunk bed for providing restraint and secondary collision protection to an occupant. At least one support bar 60 is inserted into the generally tubular padding 40. The support bar 60 is preferably made from a hard inflexible material, for example, steel or rigid plastic. The support bar 60 extends through the entire length of the generally tubular padding 40. Each end of the support bar 60 partially protrudes from the generally tubular padding 40. Latches 41 are fixedly attached to the rear wall 13 above the bunk bed and are configured to receive the protruding ends of the support bar 60. Preferably the latch 41 is of a broom clip style and is configured to receive the ends of the support bar 60. The support bar 60 is secured by pushing the ends protruding from the padding 40 into the broom clip style latch 41. Other attachment means can be used and will be apparent to one skilled in the art in view of this disclosure.

Another embodiment of the present invention for providing more compact storage above the bunk bed includes an elastic 34 attached to the strap 31 in an area not having padding 40 attached thereto as shown in the exploded view of FIG. 5A. One end of the elastic is attached to the strap. The elastic is stretched and is attached along the length of the strap. The elastic is preferably sewn onto the strap. As shown in FIGS. 5 and 5A, when the occupant restraint system 10 is in use the elastics 34 will be in the stretched position. When the occupant restraint system 10 is not in use the elastics 34 will be in the relaxed position whereby the straps 31 will fold and collapse for providing compact storage when not in use, as shown in FIG. 4.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention as hereinafter claimed.

What is claimed is:

1. A restraint system for protecting occupants in a sleeping compartment of a vehicle including a bunk bed comprising:

at least two flexible straps each having a first end and a second end, each said strap extending from said first end over said bunk bed to said second end;

an energy absorbent padding attached to at least two of said straps in a longitudinal position relative to said bunk for providing, when in use, restraint and secondary collision protection to an occupant wherein said padding is at least one generally tubular profile;

a support bar extending through at least one of said profiles, said support bar partially protruding from said profile;

locking means comprising at least two first releasable locks respectively attached to each one of said second ends and at least two second releasable locks respectively attached to said vehicle wherein each one of said second releasable locks is releasably lockable with an associated one of said first releasable locks; and at least two strap retractors attached to the vehicle and respectively having said first ends attached thereto, each of said strap retractors being operable to retract a connected one of said straps when said first locking means are separated whereby said straps retract into a stored position.

2. The restraint system of claim 1, wherein said padding is in a horizontal position with its longitudinal axis generally transverse to the direction of movement of said vehicle.

3. The restraint system of claim 1, wherein said strap retraction means is located underneath said bunk bed.

4. A restraint system for protecting occupants in a sleeping compartment of a vehicle including a bunk bed comprising:

a) at least two flexible straps each having a first end and a second end, each said strap extending from said first end over said bunk bed to a second end;

b) an energy absorbent padding attached to said straps in a position relative to the bunk for providing, when in use, restraint and secondary collision protection to an occupant;

c) said padding having at least one generally tubular profile;

d) at least two first releasable locks respectively attached to said second ends;

e) at least two second releasable locks respectively fixedly attached to said vehicle and each being releasably lockable with a different one of said first locking means;

f) at least two strap retractors attached to the vehicle and respectively having said first ends attached hereto, each of said strap retractors being operable to retract a connected one of said straps when said first locking means and said second locking means are separated whereby said straps retract into a stored position; and, g) a support bar extending through said at least one tubular profile and partially protruding from said at least one profile.

5. The restraint system of claim 4, wherein said support bar is latched to the vehicle when in a stored position.

6. The restraint system of claim 5, wherein said latch comprises a broom clip style.

7. In an over-the-highway tractor having a sleeping bunk within a sleeping space an improved occupant restraint system comprising:

a) a plurality of belts spaced longitudinally of the bunk when in use, each belt including a restraint portion, each restraint portion having when in use a restraint position extending upwardly and laterally inwardly relative to an occupant support surface delineated by the bunk;

b) each belt having spaced anchors, the anchors being for selectively maintaining the restraint portions in their respective restraint positions;

c) at least three interlocking generally tubular profile paddings attached to said belts in a longitudinal position relative to the bunk, wherein the at least three tubular paddings consist of two outer paddings which include a support bar inserted through the tubular padding and the other at least one tubular padding is located between the two outer paddings, whereby the at least three tubular paddings continuously interlock, with each other along the entire lengths of their longitudinal sides.

8. The tractor of claim 1 wherein at least certain of the cushioning members are juxtaposed.

9. An improved over the highway tractor having a restraint system for protecting an occupant, a sleeping compartment and a bunk bed in the compartment an occupant restraint system comprising:

a) at least two flexible straps each having a first end fixedly attached to a selected one of the tractor and the bunk bed, each strap also having a second end, said straps extending when in use from said first ends transversely across said bunk bed to said second ends, the belts being in longitudinally spaced relationship;

b) at least three interlocking generally tubular profile paddings attached to said straps in a longitudinal position relative to the bunk, wherein the at least three tubular paddings consist of two outer paddings which include a support bar inserted through the tubular padding and the other at least one tubular padding is located between the two outer paddings, whereby the at least three tubular paddings continuously interlock with each other along the entire lengths of their longitudinal sides;

c) a pair of releasable locks for fixedly attaching, when in use, the second ends to the other one of said tractor and said bunk bed.

10. A restraint system for protecting an occupant in a sleeping compartment of a vehicle including a bunk bed comprising:
   a) at least two flexible straps each having a first end fixedly attached to a selected one of the vehicle and the bunk, each strap also having a second end, said straps extending when in use from said first ends over said bunk bed to said second ends;
   b) at least three interlocking generally tubular profile paddings attached to said straps in a longitudinal position relative to the bunk, wherein the at least three tubular paddings consist of two outer paddings which include a support bar inserted through the tubular padding and the other at least one tubular padding is located between the two outer paddings, whereby the at least three tubular paddings continuously interlock with each other along the entire lengths of their longitudinal sides; and,
   c) a pair of releasable locks for fixedly attaching the second ends each to selected ones of said vehicle and said bunk.

11. A restraint system for protecting occupants in a sleeping compartment of a vehicle including a bunk bed comprising:
   a) at least two flexible straps each having a first end and a second end, each said strap extending from said first end over said bunk bed to said second end;
   b) at least three interlocking generally tubular profile paddings attached to said straps in a longitudinal position relative to the bunk, wherein the at least three tubular paddings consist of two outer paddings which include a support bar inserted through the tubular padding and the other at least one tubular padding is located between the two outer paddings, whereby the at least three tubular paddings continuously interlock with each other along the entire lengths of their longitudinal sides;
   c) at least two first releasable locks respectively attached to said second ends;
   d) at least two second releasable locks respectively fixedly attached to said vehicle and each being releasably lockable with a different one of said first locking means; and
   e) at least two strap retractors attached to the vehicle and respectively having said first ends attached thereto, each of said strap retractors being operable to retract a connected one of said straps when said first locking means and said second locking means are separated whereby said straps retract into a stored position.

* * * * *